(12) United States Patent
Wiemann et al.

(10) Patent No.: US 11,057,763 B2
(45) Date of Patent: Jul. 6, 2021

(54) METHODS FOR ADVERTISING EXTENSIBLE CAPABILITY FEATURE SETS FOR USER EQUIPMENT (UE)

(71) Applicant: Telefonaktiebolaget LM Ericsson (publ), Stockholm (SE)

(72) Inventors: Henning Wiemann, Aachen (DE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 16/485,838

(22) PCT Filed: May 28, 2019

(86) PCT No.: PCT/SE2019/050491
§ 371 (c)(1),
(2) Date: Aug. 14, 2019

(87) PCT Pub. No.: WO2019/231384
PCT Pub. Date: Dec. 5, 2019

(65) Prior Publication Data
US 2021/0058767 A1    Feb. 25, 2021

Related U.S. Application Data

(60) Provisional application No. 62/678,047, filed on May 30, 2018.

(51) Int. Cl.
*H04W 8/24*    (2009.01)
*H04W 72/04*   (2009.01)
*H04W 76/15*   (2018.01)

(52) U.S. Cl.
CPC ......... *H04W 8/24* (2013.01); *H04W 72/0413* (2013.01); *H04W 72/0453* (2013.01); *H04W 76/15* (2018.02)

(58) Field of Classification Search
CPC ... H04W 8/24; H04W 76/15; H04W 72/0413; H04W 72/0453
See application file for complete search history.

(56) References Cited

U.S. PATENT DOCUMENTS

2013/0281151 A1   10/2013   Koskela et al.
2014/0092825 A1    4/2014   Bostrom et al.
(Continued)

OTHER PUBLICATIONS

"[Draft] LS on signalling on intra-band NC CA", 3GPP TSG-RAN WG4 #86; R4-1803363; Athens, Greece, Feb. 26-Mar. 2, 2018, pp. 1-2.

(Continued)

*Primary Examiner* — Brian D Nguyen
(74) *Attorney, Agent, or Firm* — Murphy, Bilak & Homilier, PLLC

(57) ABSTRACT

Embodiments include methods for a user equipment (UE) to advertise capabilities to a network node in a radio access network. Embodiments include transmitting, to the network node, information describing a plurality of feature sets supported by the UE. The information can include one or more InitialFeatureLists and one or more ExtensionFeatureLists, with each each ExtensionFeatureList being associated with a particular InitialFeatureList. Embodiments also include transmitting, to the network node, one or more BandCombination elements, each of which includes: a list of frequency bands in which the UE is concurrently operable; a FeatureSetCombination element identifying features supported by the UE within each frequency band included in the list. Some embodiments can also include receiving, from the network node, a configuration (e.g., for dual connectivity and/or carrier aggregation) based on the information describing a plurality of feature sets and the BandCombination elements. Other embodiments include complementary methods performed by a network node.

26 Claims, 12 Drawing Sheets

(56) References Cited

U.S. PATENT DOCUMENTS

| | | | | |
|---|---|---|---|---|
| 2014/0140318 A1* | 5/2014 | Uemura | ............ | H04W 8/24 370/330 |
| 2014/0219170 A1* | 8/2014 | Zhao | ............ | H04W 8/24 370/328 |
| 2014/0329557 A1* | 11/2014 | Van der Velde | ...... | H04W 48/16 455/552.1 |
| 2016/0029209 A1 | 1/2016 | Kim et al. | | |
| 2017/0251478 A1* | 8/2017 | Kim | ............ | H04W 72/0413 |
| 2017/0367073 A1* | 12/2017 | Murugan | ............ | H04B 1/0053 |
| 2018/0227904 A1* | 8/2018 | Raghunathan | ...... | H04W 72/048 |
| 2019/0053221 A1* | 2/2019 | Takahashi | ............ | H04W 8/24 |
| 2019/0075585 A1* | 3/2019 | Deogun | ............ | H04W 72/1268 |
| 2019/0261286 A1* | 8/2019 | Suzuki | ............ | H04W 52/34 |
| 2021/0022083 A1* | 1/2021 | Takahashi | ............ | H04W 8/24 |

OTHER PUBLICATIONS

"3GPP TS 36.423 V15.1.0", 3rd Generation Partnership Project; Technical Specification Group Radio Access Network; Evolved Universal Terrestrial Radio Access Network (E-UTRAN); X2 application protocol (X2AP) (Release 15), Mar. 2018, pp. 1-354.

"3GPP TS 38.306 V15.1.0", 3rd Generation Partnership Project; Technical Specification Group Radio Access Network; NR; User Equipment (UE) radio access capabilities (Release 15), Mar. 2018, pp. 1-25.

"3GPP TS 38.331 V15.5.1", 3rd Generation Partnership Project; Technical Specification Group Radio Access Network; NR; Radio Resource Control (RRC) protocol specification (Release 15), Apr. 2019, pp. 1-491.

"3GPP TS 38.423 V0.8.0", 3rd Generation Partnership Project; Technical Specification Group Radio Access Network; NG-RAN; Xn application protocol (XnAP) (Release 15), Apr. 2018, pp. 1-109.

"Draft Reply LS on Baseband Processing Capabilities", 3GPP TSG-RAN WG4 RAN4#86; R4-1803563; Athens, Greece, Feb. 26-Mar. 2, 2018, pp. 1-2.

"LS reply on formula or table for L1 data rate", 3GPP TSG RAN WG2#AH-1801; R2-1800012; Vancouver, Canada, Jan. 22-26, 2018, pp. 1-2.

"LS reply on UE RF related parameters, capabilities and features for NR standalone", 3GPP TSG RAN WG2#101; R2-1804077; Athens, Greece, Feb. 26-Mar. 2, 2018, pp. 1-2.

"3GPP TS 36.331 V15.1.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2018, pp. 1-786.

"3GPP TS 38.101-1 V15.1.0", 3rd Generation Partnership Project; Technical Specification Group Radio Access Network; NR; User Equipment (UE) radio transmission and reception; Part 1: Range 1 Standalone (Release 15), Mar. 2018, pp. 1-42.

"3GPP TS 38.101-2 V15.1.0", 3rd Generation Partnership Project; Technical Specification Group Radio Access Network; NR; User Equipment (UE) radio transmission and reception; Part 2: Range 2 Standalone (Release 15), Mar. 2018, pp. 1-5.

"3GPP TS 38.101-3 V15.1.0", 3rd Generation Partnership Project; Technical Specification Group Radio Access Network; NR; User Equipment (UE) radio transmission and reception; Part 3: Range 1 and Range 2 Interworking operation with other radios (Release 15), Mar. 2018, pp. 1-54.

"WF for NR BW Class", 3GPP; R4-1803374; https://www.3gpp.org/ftp/tsg_ran/WG4_Radio/TSGR4_86/Docs/, Mar. 5, 2018, pp. 1-5.

"3GPP TS 38.331 V15.1.0"; 3rd Generation Partnership Project; Technical Specification Group Radio Access Network; NR; Radio Resource Control (RRC) protocol specification (Release 15), Mar. 2018, pp. 1-268.

* cited by examiner

```
-- ASN1START
-- TAG-BANDCOMBINATIONLIST-START

BandCombinationList  ::=   SEQUENCE (SIZE (1..maxBandComb)) OF BandCombination

BandCombination ::= SEQUENCE {
    bandList                       SEQUENCE (SIZE (1..maxSimultaneousBands)) OF BandParameter,
    bandCombinationParameters      BandCombinationParameters                             OPTIONAL,
    featureSetCombination          FeatureSetCombinationId
}

BandParameter ::=           CHOICE {
    bandEUTRA                      FreqBandIndicatorEUTRA,
    bandNR                         FreqBandIndicatorNR
}

BandCombinationParameters ::=  SEQUENCE {
    ca-ParametersEUTRA             CA-ParametersEUTRA                        OPTIONAL,
    ca-ParametersNR                CA-ParametersNR                           OPTIONAL,
    mrdc-Parameters                MRDC-Parameters                           OPTIONAL,
    supportedBandwidthCombinationSet  BIT STRING (SIZE (1..32))              OPTIONAL
}

MRDC-Parameters ::=SEQUENCE {
    singleUL-Transmission          ENUMERATED {supported}                    OPTIONAL,
    ul-SharingEUTRA-NR             ENUMERATED {supported}                    OPTIONAL,
    ul-SwitchingTimeEUTRA-NR       ENUMERATED {type1, type2}                 OPTIONAL,
    simultaneousRxTxInterBandENDC  ENUMERATED {supported}                    OPTIONAL,
    asyncIntraBandENDC             ENUMERATED {supported}                    OPTIONAL
}

-- TAG-BANDCOMBINATIONLIST-STOP
-- ASN1STOP
```

FIG. 1

```
-- ASN1START
-- TAG-FEATURESETS-START

FeatureSets ::=                   SEQUENCE {
    featureSetsDownlink           SEQUENCE (SIZE (1..maxDownlinkFeatureSets))      OF FeatureSetDownlink          OPTIONAL,
    featureSetsDownlinkPerCC      SEQUENCE (SIZE (1..maxPerCC-FeatureSets))        OF FeatureSetDownlinkPerCC     OPTIONAL,
    featureSetsUplink             SEQUENCE (SIZE (1..maxUplinkFeatureSets))        OF FeatureSetUplink            OPTIONAL,
    featureSetsUplinkPerCC        SEQUENCE (SIZE (1..maxPerCC-FeatureSets))        OF FeatureSetUplinkPerCC       OPTIONAL,
    featureSetCombinations        SEQUENCE (SIZE (1..maxFeatureSetCombinations))   OF FeatureSetCombination       OPTIONAL,
    ...
}

-- ASN1STOP
-- TAG-FEATURESETS-STOP
```

*FIG. 2*

```
-- ASN1START
-- TAG-FEATURESETCOMBINATION-START

FeatureSetCombination ::=   SEQUENCE (SIZE (1..maxSimultaneousBands)) OF FeatureSetsPerBand
FeatureSetsPerBand    ::=   SEQUENCE (SIZE (1..maxFeatureSetsPerBC))  OF FeatureSet FeatureSet ::=     CHOICE {
    eutra          SEQUENCE {
        downlinkSetEUTRA       FeatureSetEUTRA-DownlinkId,
        uplinkSetEUTRA         FeatureSetEUTRA-UplinkId
    },
    nr             SEQUENCE {
        downlinkSetNR          FeatureSetDownlinkId,
        uplinkSetNR            FeatureSetUplinkId
    }
}

-- ASN1STOP
-- TAG-FEATURESETCOMBINATION-STOP
```

*FIG. 3*

```
-- ASN1START
-- TAG-FEATURESETS-START

FeatureSets ::= SEQUENCE {
    featureSetsDownlink            SEQUENCE (SIZE (1..maxDownlinkFeatureSets)) OF FeatureSetDownlink       OPTIONAL,
    featureSetsDownlinkPerCC       SEQUENCE (SIZE (1..maxPerCC-FeatureSets))   OF FeatureSetDownlinkPerCC  OPTIONAL,
    featureSetsUplink              SEQUENCE (SIZE (1..maxUplinkFeatureSets))   OF FeatureSetUplink         OPTIONAL,
    featureSetsUplinkPerCC         SEQUENCE (SIZE (1..maxPerCC-FeatureSets))   OF FeatureSetUplinkPerCC    OPTIONAL,
    ...
    featureSetCombinations         SEQUENCE (SIZE (1..maxFeatureSetCombinations)) OF FeatureSetCombination OPTIONAL,
    featureSetsUplinkPerCC-v1540   SEQUENCE (SIZE (1..maxPerCC-FeatureSets))   OF FeatureSetUplinkPerCC-v1540 OPTIONAL
    featureSetsDownlink-r16        SEQUENCE (SIZE (1..maxDownlinkFeatureSets)) OF FeatureSetDownlink-r16 OPTIONAL
}
-- ASN1STOP
-- TAG-FEATURESETS-STOP
```

FIG. 4

```
-- ASN1START
-- TAG-FEATURESETDOWNLINK-START

FeatureSetDownlink ::=         SEQUENCE {
    intraBandFreqSeparationDL  FreqSeparationClass                                      OPTIONAL,
    featureSetListPerDownlinkCC SEQUENCE (SIZE (1..maxNrofServingCells)) OF FeatureSetDownlinkPerCC-Id
    ...
}

FeatureSetDownlink-r16         SEQUENCE {
    newDownlinkFeature1        ENUMERATED {supported}                                   OPTIONAL,
    newDownlinkFeature2        INTEGER (1..6)                                           OPTIONAL,
    newDownlinkFeature3        ENUMERATED {alittle, alittleMore}                        OPTIONAL
}
-- TAG-FEATURESETDOWNLINK-STOP
-- ASN1STOP
```

FIG. 5

```
-- ASN1START
-- TAG-FEATURESETUPLINKPERCC-START

FeatureSetUplinkPerCC ::=              SEQUENCE {
    supportedSubcarrierSpacingUL       SubcarrierSpacing,
    supportedBandwidthUL               CHOICE {
        fr1                                ENUMERATED {mhz5, mhz10, mhz15, mhz20,
                                                       mhz25, mhz30, mhz40, mhz50,
                                                       mhz60, mhz80, mhz100},
        fr2                                ENUMERATED {mhz50, mhz100, mhz200, mhz400}
    },
    scalingFactor0dot75                ENUMERATED {supported}           OPTIONAL,
    maxNumberMIMO-LayersCB-PUSCH       MIMO-LayersUL                    OPTIONAL,
    maxNumberMIMO-LayersNonCB-PUSCH    MIMO-LayersUL                    OPTIONAL,
    supportedModulationOrderUL         ModulationOrder                  OPTIONAL,
    supportedSRS-Resources             SRS-Resources                    OPTIONAL,
    srs-TxSwitch                       -TxSwitch                        OPTIONAL,
    lowLatencyCSI-Feedback             ENUMERATED {supported}           OPTIONAL,
    pusch-DifferentTB-PerSlot          SEQUENCE {
        scs-15kHz                          ENUMERATED {upto2, upto7}    OPTIONAL,
        scs-30kHz                          ENUMERATED {upto2, upto7}    OPTIONAL,
        scs-60kHz                          ENUMERATED {upto2, upto7}    OPTIONAL,
        scs-120kHz                         ENUMERATED {upto2, upto7}    OPTIONAL
    }                                  OPTIONAL,
    twoPUCCH-Group                     ENUMERATED {supported}           OPTIONAL,
    diffNumerologyAcrossPUCCH-Group    ENUMERATED {supported}           OPTIONAL,
    diffNumerologyWithinPUCCH-Group    ENUMERATED {supported}           OPTIONAL,
    crossCarrierScheduling             ENUMERATED {supported}           OPTIONAL,
    supportedNumberTAG                 ENUMERATED {n2, n3, n4}          OPTIONAL,
    dynamicSwitchSUL                   ENUMERATED {supported}           OPTIONAL,
    simultaneousTxSUL-NonSUL           ENUMERATED {supported}           OPTIONAL,
    searchSpaceSharingCA-UL            ENUMERATED {supported}           OPTIONAL
}

FeatureSetUplinkPerCC-v1540 ::=        SEQUENCE {
    newUplinkFeaturePerCCFeature1      ENUMERATED {supported}           OPTIONAL,
    newUplinkFeaturePerCCFeature2      ENUMERATED {supported}           OPTIONAL
}

-- TAG-FEATURESETUPLINKPERCC-STOP
-- ASN1STOP
```

FIG. 6

```
-- ASN1START
-- TAG-UE-MRDC-CAPABILITY-START

UE-MRDC-Capability ::=         SEQUENCE {
    measAndMobParametersMRDC        MeasAndMobParametersMRDC              OPTIONAL,
    phy-ParametersMRDC-v1530        Phy-ParametersMRDC                    OPTIONAL,
    rf-ParametersMRDC               RF-ParametersMRDC,
    generalParametersMRDC           GeneralParametersMRDC-XDD-Diff        OPTIONAL,
    fdd-Add-UE-MRDC-Capabilities    UE-MRDC-CapabilityAddXDD-Mode         OPTIONAL,
    tdd-Add-UE-MRDC-Capabilities    UE-MRDC-CapabilityAddXDD-Mode         OPTIONAL,
    fr1-Add-UE-MRDC-Capabilities    UE-MRDC-CapabilityAddFRX-Mode         OPTIONAL,
    fr2-Add-UE-MRDC-Capabilities    UE-MRDC-CapabilityAddFRX-Mode         OPTIONAL,
    featureSetCombinations          SEQUENCE (SIZE (1..maxFeatureSetCombinations)) OF FeatureSetCombination  OPTIONAL,
    pdcp-ParametersMRDC-v1530       PDCP-ParametersMRDC                   OPTIONAL,
    lateNonCriticalExtension        OCTET STRING                          OPTIONAL,
    nonCriticalExtension            SEQUENCE {}                           OPTIONAL
}

...

-- TAG-UE-MRDC-CAPABILITY-STOP
-- ASN1STOP
```

FIG. 7

```
-- ASN1START
-- TAG-FEATURESET-DOWNLINK-ID-START

FeatureSetDownlinkId ::= INTEGER (0..maxDownlinkFeatureSets)

-- TAG-FEATURESET-DOWNLINK-ID-STOP
-- ASN1STOP
```

FIG. 8A

```
-- ASN1START
-- TAG-FEATURESET-UPLINK-ID-START

FeatureSetUplinkId ::= INTEGER (0..maxUplinkFeatureSets)

-- TAG-FEATURESET-UPLINK-ID-STOP
-- ASN1STOP
```

FIG. 8B

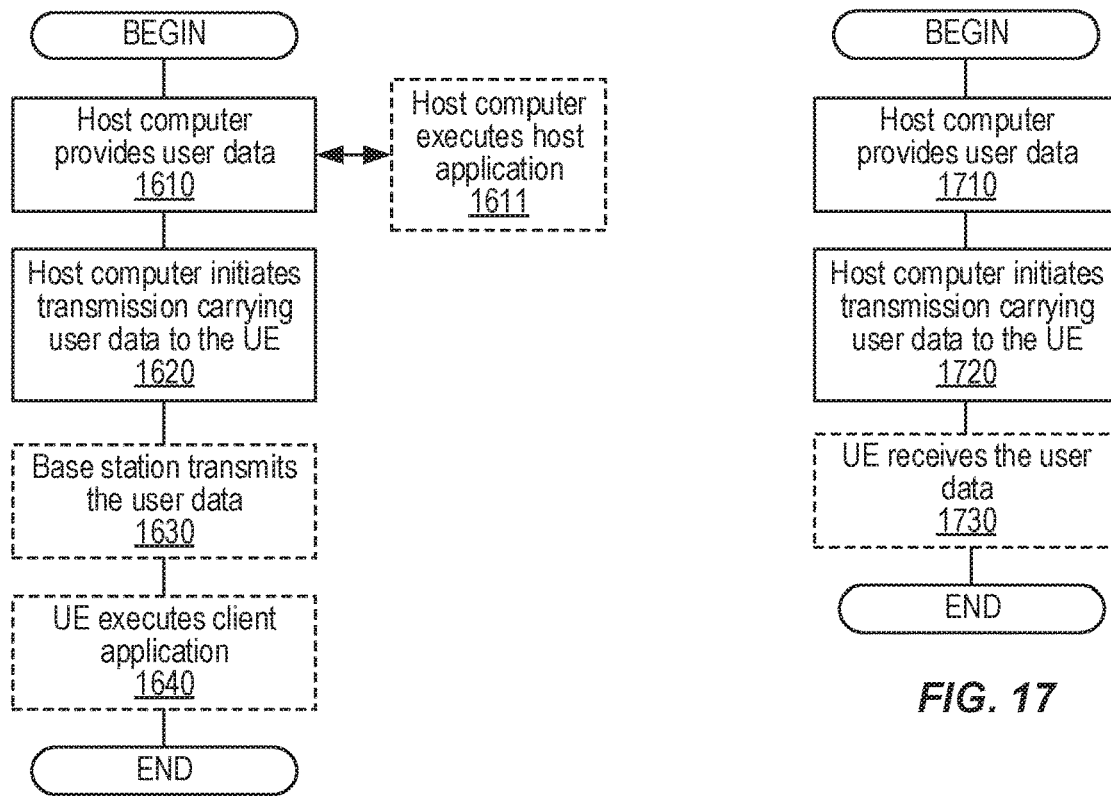
FIG. 16
FIG. 17
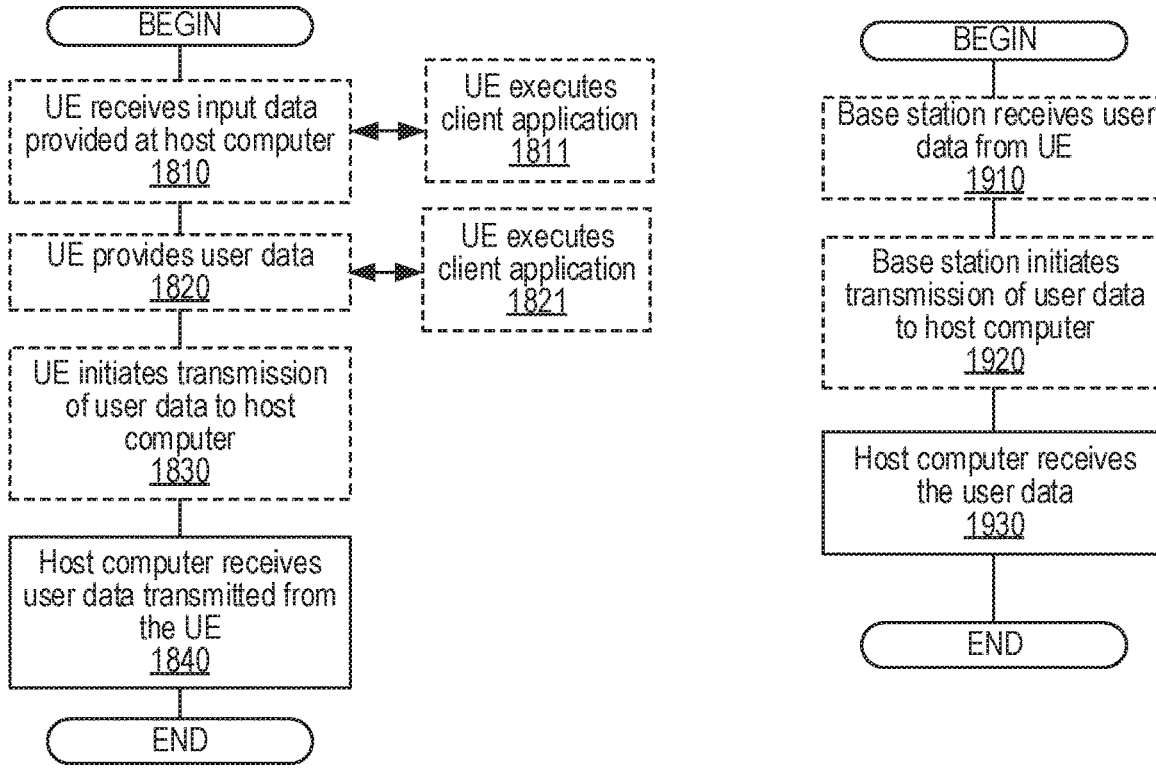
FIG. 18
FIG. 19

METHODS FOR ADVERTISING EXTENSIBLE CAPABILITY FEATURE SETS FOR USER EQUIPMENT (UE)

TECHNICAL FIELD

The present disclosure relates generally to the field of wireless communications, and more specifically to techniques that enable a wireless device to advertise its supported features and/or capabilities to a wireless network, thereby facilitating interoperability between the device and the network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non-Access Stratum (NAS) messages between the UE and eNB. A new SRB, known as SRB ibis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

In many communication protocols, the two participating parties (or "peers") exchange the information about their respective capabilities. This ensures that each peer does not request any capability which is not supported by the other peer. In LTE, the UE Capability Information is an RRC message that a UE sends to the serving eNB, usually during an initial registration process with the LTE network. This RRC message informs the network about all the details of the UE's capabilities.

In the LTE UE Capability Information message, the UE can indicate not only whether it supports a particular feature, but also whether it supports such a feature when operating on particular frequency band(s). In other words, the UE can indicate that it supports the particular feature when operating on one or more frequency bands, but not when operating on one or more other frequency bands. In addition, the UE can indicate that it supports certain features but not necessarily the combination thereof.

Furthermore, the UE can advertise supported band combinations. These can be advertised, e.g., in a BandCombinationList information element (IE) that identifies one or more band combinations. Each advertised band combination indicates the one or more bands that the UE is capable to combine in operation, e.g., by carrier aggregation (CA) of one or more RF carriers in each band. In addition, the UE can indicate whether it supports the particular feature(s) on each band combination that the UE is capable of aggregating. As LTE releases go higher and more features are added, the UE Capability Information message has become one of the longest and most complicated RRC messages.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

In NR, the UE advertises its capabilities similarly as in LTE. For example, the UE can indicate not only whether it supports a particular feature, but also whether it supports such a feature when operating on particular frequency band(s). In other words, the UE can indicate that it supports the particular feature when operating on one or more frequency bands, but not when operating on one or more other frequency bands. Also like in LTE, the UE can indicate that it supports certain features but not necessarily the combination thereof. As a further similarity to LTE, the UE can advertise supported band combinations using, e.g., the BandCombinationList IE. In addition, as part of this IE, the UE can indicate whether it supports the particular feature(s) on each band combination that the UE is capable of aggregating.

Unlike LTE, however, the NR UE Capability Information signalling for indicating such fine-grained feature support was not directly embedded into the BandCombinationList IE. Rather, the NR UE capability signaling is split into band combinations and feature set combinations, which are band-independent such that they can be associated with any particular band combination. This arrangement has the potential to reduce the overall signaling overhead if several band combinations (of which there can be many) point to the same feature set combinations, if several feature set combinations point to the same feature sets, and/or if several feature sets point to the same per-CC feature set. Nevertheless, compared to the conventional approach used in LTE, this arrangement can result in difficulties if features are extended in future NR releases, as has often been the case with LTE.

SUMMARY

Exemplary embodiments disclosed herein address these problems, issues, and/or drawbacks of existing solutions by providing a flexible and efficient approach for advertising extensible UE capabilities in a radio access network (RAN). Such embodiments can reduce and/or minimize the overhead required to advertise extensions to initial and/or original feature sets, while providing backward compatibility with legacy network nodes that do not recognize and/or support such extensions.

Exemplary embodiments of the present disclosure include methods and/or procedures for advertising user equipment (UE) capabilities to a network node in a radio access network (RAN). The exemplary method and/or procedure can be performed by a UE or wireless device.

The exemplary method and/or procedure can include transmitting, to the network node, information describing a plurality of feature sets supported by the UE. The information can include one or more InitialFeatureLists, with each InitialFeatureList comprising one or more non-extensible InitialFeatureSet elements, and each non-extensible InitialFeatureSet element indicating the UE's support for one or more initial features. The information can also include one or more ExtensionFeatureLists, with each ExtensionFeatureList being associated with a particular InitialFeatureList. Each ExtensionFeatureList can include one or more ExtensionFeatureSet elements, with each ExtensionFeatureSet element indicating the UE's support for one or more extension features.

The exemplary method and/or procedure can also include transmitting, to the network node, one or more BandCombination elements. Each BandCombination element can include a list of frequency bands in which the UE can concurrently transmit and/or receive information. Each BandCombination element can also include a FeatureSetCombination element that identifies features supported by the UE within each frequency band included in the list. The identified features for a particular frequency band can be based on a particular InitialFeatureSet element from each InitialFeatureList, and on a corresponding ExtensionFeatureSet element from the ExtensionFeatureList associated with each InitialFeatureList.

In some embodiments, the exemplary method and/or procedure can also include receiving, from the network node, a configuration including identification of one or more frequency bands, wherein the identified frequency bands are part of a list included in a particular transmitted BandCombination element. The configuration can also identify, for each of the identified frequency bands, configuration of one or more features identified by the particular BandCombination element. In this manner, the UE can receive a configuration that is based on the capabilities information provided to the network node.

In some embodiments, the exemplary method and/or procedure can also include transmitting or receiving information with the network node in the identified frequency bands according to the received configuration.

Exemplary embodiments of the present disclosure also include methods and/or procedures for determining capabilities of a user equipment (UE). Such exemplary method and/or procedure can be implemented in a network node (e.g., base station, gNB, eNB, or component thereof) of a radio access network (RAN).

The exemplary method and/or procedure can include receiving, from the UE, information describing a plurality of feature sets supported by the UE. The information can include one or more InitialFeatureLists, with each InitialFeatureList comprising one or more non-extensible InitialFeatureSet elements, and each non-extensible InitialFeatureSet element indicating the UE's support for one or more initial features. The information can also include one or more ExtensionFeatureLists, with each ExtensionFeatureList being associated with a particular InitialFeatureList. Each ExtensionFeatureList can include one or more ExtensionFeatureSet elements, with each ExtensionFeatureSet element indicating the UE's support for one or more extension features.

The exemplary method and/or procedure can also include receiving, from the UE, one or more BandCombination elements. Each BandCombination element can include a list of frequency bands in which the UE can concurrently transmit and/or receive information. Each BandCombination element can also include a FeatureSetCombination element that identifies features supported by the UE within each frequency band included in the list. The identified features for a particular frequency band can be based on a particular InitialFeatureSet element from each InitialFeatureList, and on a corresponding ExtensionFeatureSet element from the ExtensionFeatureList associated with each InitialFeatureList.

The exemplary method and/or procedure can also include determining the UE's capabilities based on the received one or more BandCombination elements and the received information describing the plurality of feature sets supported by the UE.

In some embodiments, the exemplary method and/or procedure can also include transmitting, to the UE, a configuration including identification of one or more frequency bands, wherein the identified frequency bands are part of a list included in a particular transmitted BandCombination element. The configuration can also identify, for each of the identified frequency bands, configuration of one or more features identified by the particular BandCombination element. In this manner, the network node can provide the UE with a configuration that is based on the capabilities information provided to the network node.

In some embodiments, the exemplary method and/or procedure can also include transmitting or receiving information with the UE in the plurality of frequency bands according to the transmitted configuration.

Other exemplary embodiments include user equipment (UEs, wireless device, etc. or components thereof) and network nodes (e.g., base stations, gNBs, eNBs, etc. or components thereof) configured to perform operations corresponding to the exemplary methods and/or procedures described herein. Other exemplary embodiments include non-transitory, computer-readable media storing program instructions that, when executed by at least one processor of a UE or network node, configure such UEs or network nodes to perform operations corresponding to exemplary methods and/or procedures described herein.

These and other objects, features, and advantages of the present disclosure will become apparent upon reading the following Detailed Description in view of the drawings briefly described below.

BRIEF DESCRIPTION OF THE DRAWINGS

FIG. 1 shows exemplary ASN.1 code used to specify a BandCombinationList information element (IE) usable for UE capability signaling in NR networks.

FIG. 2 shows exemplary ASN.1 code used to specify a FeatureSets IE usable for UE capability signaling in NR networks.

FIG. 3 shows exemplary ASN.1 code used to specify a FeatureSetCombination IE usable for UE capability signaling in NR networks.

FIG. 4 shows exemplary ASN.1 code used to specify a FeatureSets IE usable for extensible UE capability signaling in NR networks, according to exemplary embodiments of the present disclosure.

FIG. 5 shows exemplary ASN.1 code used to specify a FeatureSetDownlink IE usable for extensible UE capability signaling in NR networks, according to exemplary embodiments of the present disclosure.

FIG. 6 shows exemplary ASN.1 code used to specify a FeatureSetUplinkPerCC IE usable for extensible UE capability signaling in NR networks, according to exemplary embodiments of the present disclosure.

FIG. 7 shows exemplary ASN.1 code used to specify a UE-MRDC-Capability IE usable for extensible UE capability signaling in NR networks, according to exemplary embodiments of the present disclosure.

FIGS. 8A-B show exemplary ASN.1 code used to specify FeatureSetDownlinkId and FeatureSetUplinkId IEs, respectively, usable for extensible UE capability signaling in NR networks, according to exemplary embodiments of the present disclosure

FIGS. 16-19 are flow diagrams illustrating various exemplary methods and/or procedures implemented in a communication system, according to various exemplary embodiments of the present disclosure.

DETAILED DESCRIPTION

Figure 9:
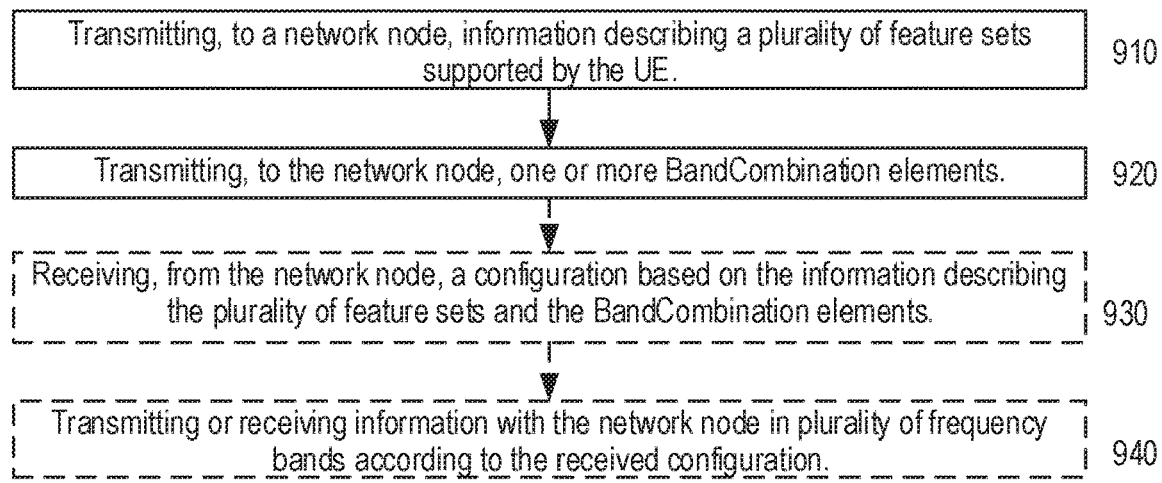
FIG. 9 is a flow diagram illustrating exemplary methods and/or procedures performed by a user equipment (UE), wireless device, or component thereof, according to various exemplary embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, the NR UE Capability Information signalling for indicating fine-grained feature support was not directly embedded into the BandCombinationList IE, as it is in LTE. Rather, the NR UE capability signaling is split into band combinations and feature set combinations, which are band-independent such that they can be associated with any particular band combination. This arrangement has the potential to reduce the overall signaling overhead if several band combinations (of which there can be many) point to the same feature set combinations, if several feature set combinations point to the same feature sets, and/or if several feature sets point to the same per-CC feature set. Nevertheless, as compared to the conventional approach used in LTE, this arrangement can result in difficulties if features are to be extended in future NR releases, as has often been the case with LTE. These are discussed in more detail below.

FIG. 1 shows exemplary ASN.1 code used to specify a BandCombinationList IE usable in NR networks. As illustrated in FIG. 1, the BandCombinationList IE includes a sequence of BandCombination elements, each representing a particular band combination that the UE is capable to support for NR or LTE carrier aggregation (CA), and/or LTE/NR dual-connectivity (e.g., EN-DC). Each BandCombination element further indicates the list of bands comprising the particular combination, and BandCombinationParameters associated with the particular combination. In addition to NR-related parameters, BandCombinationParameters can also include parameters related to LTE support and DC support for that particular band combination.

Instead of specifying the particular features associated with each band combination directly in the BandCombinationList IE, an NR UE advertises such features by sending a FeatureSets IE. The FeatureSets IE is used to provide pools of downlink (DL) and uplink (UL) features sets, as well as a pool of FeatureSetCombination elements. FIG. 2 shows exemplary ASN.1 code used to specify a FeatureSets IE usable in NR networks. As shown in FIG. 2, the FeatureSets IE includes featureSetDownlink and featureSetUplink elements that specify, respectively, a sequence of sets of DL and UL features supported by the UE in a band. For example, featureSetsDownlink is a sequence (e.g., one or more) of FeatureSetDownlink, which is a set of DL features. Note, however, that the FeatureSets IE does not associate the indicated sets of DL and UL features with a particular band. The mechanism for associating these feature sets to a particular band is explained further below.

As also shown in FIG. 2, FeatureSets IE also includes featureSetDownlinkPerCC and featureSetUplinkPerCC elements that specify, respectively, a sequence of sets of DL and UL features supported by the UE for a component carrier (CC) in a band. Note, however, that the FeatureSets IE does not associate the indicated sets of DL and UL per-CC features with a particular band. The mechanism for associating these feature sets to a particular band is explained further below.

As shown in FIG. 2, the FeatureSets IE also includes a featureSetCombinations element. This element specifies a sequence of FeatureSetCombination IEs, each of which can be associated with a particular band combination. FIG. 3 shows exemplary ASN.1 code used to specify a FeatureSetCombination IE usable in NR networks. In other words, FIG. 3 illustrates the structure of each FeatureSetCombination identified by the featureSetCombinations element shown in FIG. 2.

As shown in FIG. 3, the FeatureSetCombination IE includes a list and/or sequence of FeatureSetsPerBand, each of which identifies a sequence of sets of features that can be associated with a carriers of a particular band of a band combination. Each set in the sequence can be considered an alternative or option, such that the UE can indicate multiple supported feature-set options. Each of these sets of features is specified by a FeatureSet IE, also shown in FIG. 3. In other words, FeatureSetCombination can be considered a two-dimensional matrix of FeatureSet entries, with a column per band combination and a row per supported combination of features. All FeatureSetsPerBand in one FeatureSetCombination should have the same number of entries. The number of FeatureSetsPerBand in the FeatureSetCombination should be equal to the number of band entries in an associated band combination. The first FeatureSetPerBand applies to the first band entry of the band combination, and so on.

Each FeatureSet element includes a pair of pointers to particular DL and UL features sets specified elsewhere. In the case of NR carriers, for example, downlinkSetNR is an identification of (e.g., a pointer to) an entry in the sequence featureSetsDownlink shown in FIG. 2. Likewise, upinkSetNR is an identification of an entry in the sequence featureSetsUplink shown in FIG. 2. Similarly, for LTE/E-UTRA carriers, downlinkSetEUTRA and uplinkSetEUTRA identify respective entries in feature set lists defined for LTE (e.g., in 3GPP TS 36.331 v.15.1.0).

Returning to FIG. 1, each BandCombination entry in the BandCombinationList IE also includes a pointer (i.e., FeatureCombinationSetID) to a particular FeatureSetCombination that is included in the featureSetCombinations element of the FeatureSets IE shown in FIG. 2. In this manner, the NR UE capability signaling is split into band combinations and feature set combinations, which are band-independent such that they can be associated with any particular band combination.

If new UE-related features are standardized in the future, as expected, it will become necessary to add the corresponding capability signalling to the various elements used by the UE to advertise support for these features. This includes FeatureSetDownlink, FeatureSetUplink, FeatureSetDownlinkPerCC, and FeatureSetUplinkPerCC feature set definitions (also referred to as "data structures") that comprise the FeatureSets IE shown in FIG. 2. However, these data structures are instantiated and sent in lists, each with a particular order and length that is understood by legacy gNBs.

One option is to add a so-called "extension marker" to the feature set definitions. These extension markers can be 24 bits (e.g., three octets or bytes) in length, which is needed to indicate to the receiving network node (e.g., gNB) the length of the remainder of the data structure, which can be quite long. In effect, this length enables "legacy" network nodes that do not understand the new capability bits to "jump" over those bits and continue parsing the next feature set in the list. However, such overhead is not feasible in a list with several hundred or even a thousand entries, each of which could be extended with new capabilities.

Instead of extending the actual feature sets, as discussed above, exemplary embodiments of the present disclosure address these extensibility challenges by creating new lists of extended feature sets and associating each of those new lists (or extension lists) with a respective original list. In other words, each of the elements in that extension list is associated with an element in the original list, such that an element in both lists can be identified by the same ID, which can be specified in the FeatureSetCombination IE. Accordingly, the structure of the FeatureSetCombination IE is not changed when extending features in this manner. Likewise, each BandCombination in a BandCombinationList IE can indicate support of one or more FeatureSetCombinations by their respective IDs (e.g., respective positions in featureSetCombinations element of FeatureSets IE). Since there is no need to change IDs of the FeatureSetCombinations when adding feature extensions, there is consequently no need to change the structure of the BandCombination element used in the BandCombinationList IE.

For example, a FeatureSetDownlink-r16 extension list identifying new features (e.g., from Release 16) could be associated with an original FeatureSetDownlink list of features. When a UE advertises (e.g., by a pointer or identifier in a FeatureSetCombination IE) a particular feature set associated with an extension, it indicates that the UE supports both the original list and the extension list for that feature set. For example, if a UE indicates in FeatureSetCombination that it supports the features in FeatureSetDownlink with ID=5 (e.g., the fifth position in the list indicated by featureSetsDownlink), it implies that it also supports the features in FeatureSetDownlink-r16 associated with ID=5 (e.g., the fifth position in a corresponding extension list).

In such exemplary embodiments, the network's interpretation of the feature set advertisement in the FeatureSetCombination IE depends on whether the network supports an extension list associated with a particular original feature set. For example, if a UE indicates in FeatureSetCombination that it supports the FeatureSetDownlink with ID=5, the network node interprets that the UE also supports extensions in FeatureSetDownlink-r16 associated with ID=5, so long as the network node supports the release associated with these extensions. On the other hand, if the network node is a legacy node that does not support the release associated with these extensions, the network node interprets from FeatureSetCombination that the UE only supports the original features indicated by the particular FeatureSetDownlink. This can be facilitated by adding an "extension marker" in the manner described above. In other words, the network node ignores the FeatureSetDownlink-r16 that it does not comprehend.

Similar approaches can be used with respect to per-CC features. For example, assume that the UE supports per-CC uplink extensions specified in Release 15.4.0. If the UE indicates in the featureSetListPerUplinkCC of a FeatureSetUplink that it supports the features in FeatureSetUplinkPerCC with ID=7 (e.g., the seventh position in the list indicated by featureSetsUplinkPerCC), it implies that it also supports the features in FeatureSetUplinkPerCC-v1540 associated with ID=7 (e.g., the seventh position in a corresponding extension list).

Unlike conventional approaches, exemplary embodiments of the present disclosure require only a single ASN.1 "extension marker" per list (e.g., to add the new lists) rather than one per each feature set element comprising the lists. In this manner, exemplary embodiments are advantageously backward-compatible with legacy network nodes that do not support such extensions. As such, these legacy nodes can ignore the extensions of the feature sets based on the "extension marker". Further advantages of the exemplary embodiments include no changes required to the high-level FeatureSetCombination and BandCombinationList IEs used for advertisement, since those IEs still refer to the same IDs of feature sets and feature sets per CC.

FIG. 4 shows exemplary ASN.1 code used to specify a FeatureSets IE usable for extensible UE capability signaling in NR networks, according to exemplary embodiments of the present disclosure. In addition to the elements specified by the conventional ASN.1 code shown in FIG. 2, the FeatureSets IE shown in FIG. 4 also includes two additional elements. The first—featuresUplinkPerCC-v1540—comprises an extension list of per-CC uplink feature sets. Each entry in this list is associated with a corresponding entry in the original list, features UplinkPerCC. In other words, each extension FeatureSetUplinkPerCC-v1540 is associated with a corresponding original FeatureSetUplinkPerCC.

This is further illustrated in FIG. 6, which shows exemplary ASN.1 code used to specify a FeatureSetUplinkPerCC IE usable for extensible UE capability signaling in NR networks, according to exemplary embodiments of the present disclosure. As shown in FIG. 6, a FeatureSetUplinkPerCC IE includes parameters used to indicate support (or non-support) of various features that can be associated with an individual UL CC. Similarly, FIG. 6 also shows an associated FeatureSetUplinkPerCC-v1540 IE that includes additional parameters used to indicate support (or non-support) of various extension features (labeled "new . . . Feature1", etc.).

The second additional element in FIG. 4—featuresDownlink-v16—comprises an extension list of features that can be associated with an individual downlink band. Each entry in this list is associated with a corresponding entry in the original list, featuresDownlink. In other words, each extension FeatureSetDownlink-v16 is associated with a corresponding original FeatureSetDownlink.

This is further illustrated in FIG. 5, which shows exemplary ASN.1 code used to specify a FeatureSetDownlink IE usable for extensible UE capability signaling in NR networks, according to exemplary embodiments of the present disclosure. As shown in FIG. 5, a FeatureSetDownlink IE includes parameters used to indicate support (or non-support) of various DL features that can be associated with an individual band. Similarly, FIG. 5 also shows an associated FeatureSetDownlink-v16 IE that includes additional parameters used to indicate support (or non-support) of various extension features (labeled "new . . . Feature1", etc.).

In addition, the FeatureSetDownlink IE shown in FIG. 5 includes a featureSetListPerDownlinkCC that identifies per-CC (or per-cell) supported features specified in FeatureSetDownlinkPerCC. In particular, featureSetListPerDownlinkCC is a sequence of FeatureSetDownlinkPerCC-Id's, each of which points to a particular FeatureSetDownlinkPerCC and to a corresponding FeatureSetUplinkPerCC-v1540 supported by each of the CCs or cells. For example, an ID value of seven points to the seventh feature set in both lists. This is substantially identical to the technique for indicating support for per-CC uplink features, discussed above.

FIG. 7 shows exemplary ASN.1 code used to specify a UE-MRDC-Capability IE usable for extensible UE capability signaling in NR networks, according to exemplary embodiments of the present disclosure. In particular, the exemplary UE-MRDC-Capability includes a featureSetCombinations IE, which is a sequence or list of FeatureSetCombination elements. As shown in FIG. 3, each FeatureSetCombination element includes an array of FeatureSet elements, each of which includes the pointers FeatureSetDownlinkId and FeatureSetUplinkId. FIGS. 8A-B show exemplary ASN.1 code used to specify FeatureSetDownlinkId and FeatureSetUplinkId IEs, respectively. As discussed above, FeatureSetDownlinkId points to both initial and extension downlink features defined in FeatureSets (e.g., in FIG. 4), while FeatureSetUplinkId points to both initial and extension uplink features defined in FeatureSets.

The various exemplary embodiments illustrated by the ASN.1 code in FIGS. 4-8 can be used together with the conventional BandCombinationList and FeatureSetCombination IEs illustrated in FIGS. 1 and 3, respectively. As such, feature extensions can be signaled in a way that is understandable by network nodes supporting such extensions, but at the same time remains backward-compatible with legacy network nodes that do not recognize such feature extensions.

Put a different way, the meaning of a particular FeatureSetCombination identified in a FeatureSets IE changes when the UE advertises elements (e.g., new features) from the extension list. Although the same ID is used to identify this particular FeatureSetCombination in a BandCombination element of the BandCombinatList IE, the meaning of the BandCombination element also changes as a consequence. Even so, the structures of the original feature lists do not need to change. Hence, exemplary embodiments are comprehensible by a legacy network node which does not understand the feature extensions.

FIG. 9 is a flow diagram illustrating an exemplary method and/or procedure for advertising user equipment capabilities to a network node in a radio access network (RAN), according to various exemplary embodiments of the present disclosure. The exemplary method and/or procedure can be implemented in a user equipment (UE, wireless device, etc. or component thereof) shown in, or described in relation to, other figures herein. Furthermore, the exemplary method and/or procedure shown in FIG. 9 can be utilized cooperatively with other exemplary methods and/or procedures described herein (e.g., FIG. 10) to provide various exemplary benefits described herein. Although FIG. 9 shows blocks in a particular order, this order is merely exemplary, and the operations of the exemplary method and/or procedure can be performed in a different order than shown and can be combined and/or divided into blocks having different functionality than shown. Optional operations are indicated by dashed lines.

The exemplary method and/or procedure can include the operations of block 910, where the UE can transmit, to the network node, information describing a plurality of feature sets supported by the UE. The information can include one or more InitialFeatureLists, with each InitialFeatureList comprising one or more non-extensible InitialFeatureSet elements, and each non-extensible InitialFeatureSet element indicating the UE's support for one or more initial features. The information can also include one or more ExtensionFeatureLists, with each ExtensionFeatureList being associated with a particular InitialFeatureList. Each ExtensionFeatureList can include one or more ExtensionFeatureSet elements, with each ExtensionFeatureSet element indicating the UE's support for one or more extension features. In some embodiments, the one or more InitialFeatureLists can include a first InitialFeatureList associated with downlink operation and a second InitialFeatureList associated with uplink operation.

In some embodiments, an ExtensionFeatureSet at a particular position in an ExtensionFeatureList can correspond to an InitialFeatureSet at the same particular position in an InitialFeatureList. In some embodiments, each InitialFeatureSet element and the associated ExtensionFeatureSet element can identify features supported by the UE with respect to an entire frequency band. In such embodiments, each InitialFeatureSet element can also identify features supported by the UE with respect to individual component carriers within the particular frequency band.

In some embodiments, the information describing the plurality of features can be a FeatureSets IE comprising various elements, such as described above in relation to other figures. In such embodiments, the InitialFeatureLists of InitialFeatureSet elements can include the featureSetsDownlink list of FeatureSetDownlink elements and the featureSetsUplink list of FeatureSetUplink elements, among others. Similarly, in such embodiments, the ExtensionFeatureLists of ExtensionFeatureSet elements can include the featureSetsDownlink-r16 list of FeatureSetDownlink-r16 elements and a corresponding featureSetsUplink-r16 list of FeatureSetUplink-r16 elements, among others.

The exemplary method and/or procedure can also include the operations of block 920, where the UE can transmit, to the network node, one or more BandCombination elements. Each BandCombination element can include a list of frequency bands in which the UE can concurrently transmit and/or receive information. Each BandCombination element can also include a FeatureSetCombination element that identifies features supported by the UE within each frequency band included in the list. The features supported by the UE within a particular frequency band can be based on a particular InitialFeatureSet element from each InitialFeatureList, and on a corresponding ExtensionFeatureSet element from the ExtensionFeatureList associated with each InitialFeatureList.

In some embodiments, the FeatureSetCombination element can include one or more FeatureSetIdentifiers for each particular frequency band included in the list of frequency bands. Furthermore, each FeatureSetIdentifier can be related to a particular InitialFeatureList and to an associated ExtensionFeatureList for that particular frequency band. In addition, each FeatureSetIdentifier can identify the particular InitialFeatureSet element from the related InitialFeatureList, and the corresponding ExtensionFeatureSet element from the related ExtensionFeatureList. In some embodiments, the one or more FeatureSetIdentifiers, for each particular frequency band, can include a first FeatureSetIdentifier associated with downlink operation and a second FeatureSetIdentifier associated with uplink operation For example, the one or more BandCombination elements can be transmitted as a BandCombinationList IE, such as described above in relation to FIG. 1. In such case, the BandCombination element of this IE can include a FeatureSetCombinationID element, such as described above in relation to FIG. 1. Furthermore, this can point to a particular FeatureSetCombination in a list of featureSetCombinations, such as described above in relation to FIG. 7. The identified FeatureSetCombination can include various FeatureSet elements (e.g., as shown in FIG. 3), each of which can include FeatureSetDownlinkId and FeatureSetUplinkId elements, each of which identify both initial and extension feature sets (e.g., within the lists shown in FIG. 2).

In some embodiments, the exemplary method and/or procedure can also include the operations of block 930, where the UE can receive, from the network node, a configuration including identification of one or more frequency bands, with the identified frequency bands being part of a list included in a particular transmitted BandCombination element (e.g., transmitted in block 920). The configuration can also include, for each of the identified frequency bands, configuration of one or more features identified by the particular transmitted BandCombination element. In some embodiments, the received configuration identifies a plurality of frequency bands for dual connectivity (DC) or carrier aggregation (CA) operation. In this manner, the UE can receive a DC or CA configuration that is based on the information provided to the network node in blocks 910-920.

In some embodiments, the received configuration can include only features indicated by the InitialFeatureSet elements associated with the respective identified frequency bands. In other embodiments, the received configuration can include features indicated by both the InitialFeatureSet elements and the corresponding ExtensionFeatureSet elements associated with the respective identified frequency bands.

In some embodiments, the exemplary method and/or procedure can also include the operations of block 940, where the UE can transmit or receive information with the network node in the identified frequency bands according to the received configuration (e.g., in block 930).

Figure 10:
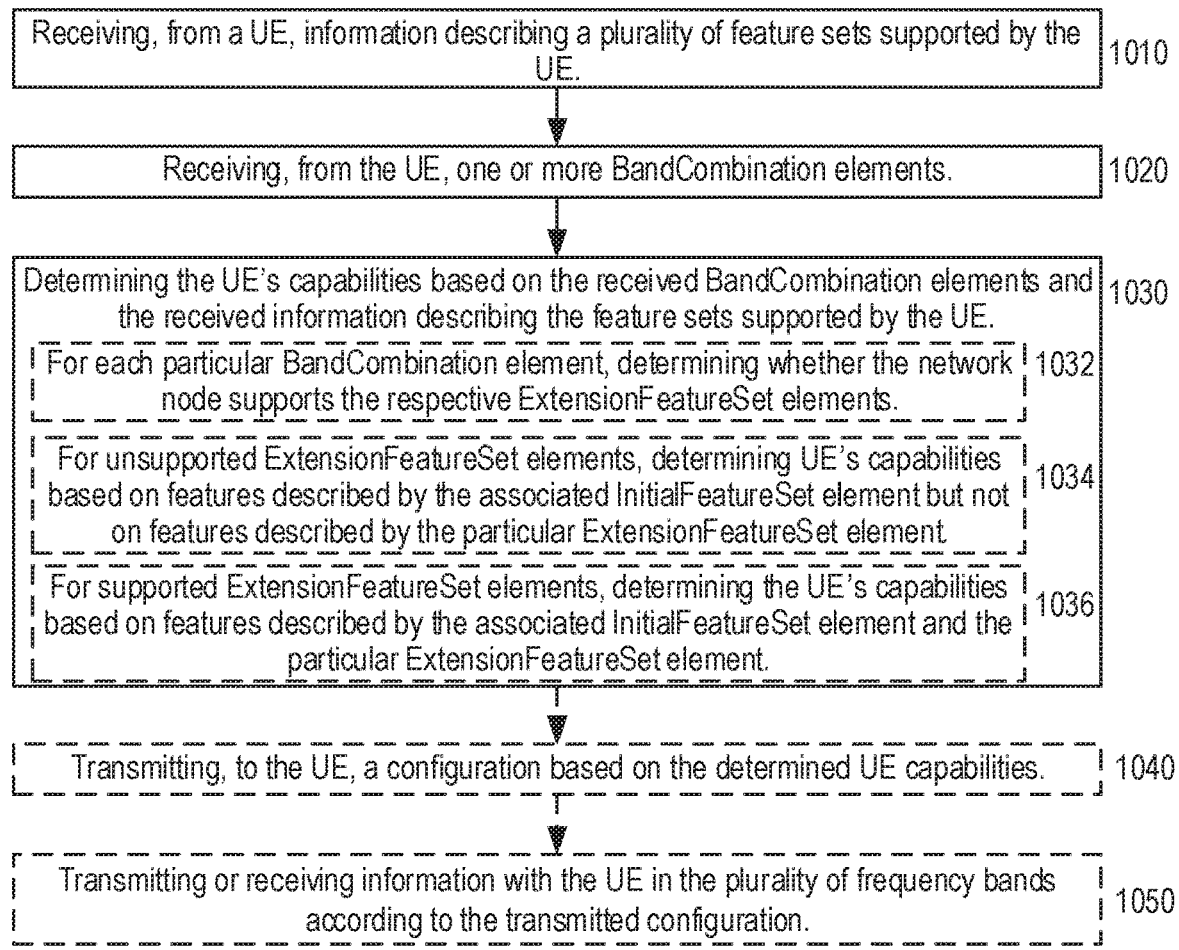
FIG. 10 is a flow diagram illustrating exemplary methods and/or procedures performed by a network node (e.g., base station, gNB, eNB, etc.) or component thereof, according to various exemplary embodiments of the present disclosure.

FIG. 10 is a flow diagram illustrating an exemplary method and/or procedure for determining capabilities of a user equipment (UE), according to various exemplary embodiments of the present disclosure. For example, the exemplary method and/or procedure can be implemented in a network node (e.g., base station, gNB, eNB, etc. or component thereof) of a radio access network (RAN) such as shown in, or described in relation to, other figures herein. Furthermore, the exemplary method and/or procedure shown in FIG. 10 can be utilized cooperatively with other exemplary method and/or procedures described herein (e.g., FIG. 9) to provide various exemplary benefits described herein. Although FIG. 10 shows blocks in a particular order, this order is merely exemplary, and the operations of the exemplary method and/or procedure can be performed in a different order than shown and can be combined and/or divided into blocks having different functionality than shown. Optional operations are represented by dashed lines.

The exemplary method and/or procedure can include the operations of block 1010, where the network node can receive, from the UE, information describing a plurality of feature sets supported by the UE. The information can include one or more InitialFeatureLists, with each InitialFeatureList comprising one or more non-extensible InitialFeatureSet elements, and each non-extensible InitialFeatureSet element indicating the UE's support for one or more initial features. The information can also include one or more ExtensionFeatureLists, with each ExtensionFeatureList being associated with a particular InitialFeatureList. Each ExtensionFeatureList can include one or more ExtensionFeatureSet elements, with each ExtensionFeatureSet element indicating the UE's support for one or more extension features. In some embodiments, the one or more InitialFeatureLists can include a first InitialFeatureList associated with downlink operation and a second InitialFeatureList associated with uplink operation.

In some embodiments, an ExtensionFeatureSet at a particular position in an ExtensionFeatureList can correspond to an InitialFeatureSet at the same particular position in an InitialFeatureList. In some embodiments, each InitialFeatureSet element and the associated ExtensionFeatureSet element can identify features supported by the UE with respect to an entire frequency band. In such embodiments, each InitialFeatureSet element can also identify features supported by the UE with respect to individual component carriers within the particular frequency band.

In some embodiments, the information describing the plurality of features can be a FeatureSets IE comprising various elements, such as described above in relation to other figures. In such embodiments, the InitialFeatureLists of InitialFeatureSet elements can include the featureSetsDownlink list of FeatureSetDownlink elements and the featureSetsUplink list of FeatureSetUplink elements, among others. Similarly, in such embodiments, the ExtensionFeatureLists of ExtensionFeatureSet elements can include the featureSetsDownlink-r16 list of FeatureSetDownlink-r16 elements and a corresponding featureSetsUplink-r16 list of FeatureSetUplink-r16 elements, among others.

The exemplary method and/or procedure can also include the operations of block 1020, where the network node can receive, from the UE, one or more BandCombination elements. Each BandCombination element can identify a list of frequency bands in which the UE can concurrently transmit and/or receive information. Each BandCombination element can also include a FeatureSetCombination element that identifies features supported by the UE within each frequency band included in the list. The features supported by the UE within a particular frequency band can be based on a particular InitialFeatureSet element from each InitialFeatureList, and on a corresponding ExtensionFeatureSet element from the ExtensionFeatureList associated with each InitialFeatureList.

In some embodiments, the FeatureSetCombination element can include one or more FeatureSetIdentifiers for each particular frequency band included in the list of frequency bands. Furthermore, each FeatureSetIdentifier can be related to a particular InitialFeatureList and to an associated ExtensionFeatureList for that particular frequency band. In addition, each FeatureSetIdentifier can identify the particular InitialFeatureSet element from the related InitialFeatureList, and the corresponding ExtensionFeatureSet element from the related ExtensionFeatureList. In some embodiments, the one or more FeatureSetIdentifiers, for each particular frequency band, can include a first FeatureSetIdentifier associated with downlink operation and a second FeatureSetIdentifier associated with uplink operation For example, the one or more BandCombination elements can be received as a BandCombinationList IE, such as described above in relation to FIG. 1. In such case, the BandCombination element of this IE can include a FeatureSetCombinationID element, such as described above in relation to FIG. 1. Furthermore, this can point to a particular FeatureSetCombination in a list of featureSetCombinations, such as described above in relation to FIG. 7. The identified FeatureSetCombination can include various FeatureSet elements (e.g., as shown in FIG. 3), each of which can include FeatureSetDownlinkId and FeatureSetUplinkId elements, each of which identify both initial and extension feature sets (e.g., within the lists shown in FIG. 2).

The exemplary method and/or procedure can also include the operations of block 1030, where the network node can determine the UE's capabilities based on the received one or more BandCombination elements and the received information describing the plurality of feature sets supported by the UE. For example, the network node can determine the UE's capabilities by parsing a BandCombinationList IE and a FeatureSets IE received from the UE.

In some embodiments, the operations of block 1030 can include the operations of sub-blocks 1032, where the network node can, for each particular BandCombination element received, determine whether the network node supports the respective ExtensionFeatureSet elements identified by the particular BandCombination element. Such embodiments can also include the operations of sub-block 1034, wherein for each particular ExtensionFeatureSet element that the network node does not support, the network node can determine the UE's capabilities based on features described by the associated InitialFeatureSet element but not on features described by the particular ExtensionFeatureSet element. For example, if the network node is a legacy node that does not support the release corresponding to the extensions associated with the ExtensionFeatureSet, it can "skip" the ExtensionFeatureSet element when it encounters an "extension marker" while parsing the received information.

Such embodiments can also include the operations of sub-block 1036, wherein for each particular ExtensionFeatureSet element that the network node does support, the network node can determine the UE's capabilities based on features described by the associated InitialFeatureSet element and by the particular ExtensionFeatureSet element.

In some embodiments, the exemplary method and/or procedure can also include the operations of block 1040, where the network node can transmit, to the UE, a configuration including identification of one or more frequency bands, with the identified frequency bands being part of a list included in a particular received BandCombination element (e.g., received in block 1020). The configuration can also include, for each of the identified frequency bands, configuration of one or more features identified by the particular received BandCombination element. In some embodiments, the transmitted configuration identifies a plurality of frequency bands for dual connectivity (DC) or carrier aggregation (CA) operation. In this manner, the network node can provide the UE a DC or CA configuration that is based on the information received from the UE in blocks 1010-1020.

In some embodiments, the transmitted configuration can include only features indicated by the InitialFeatureSet elements associated with the respective identified frequency bands. In other embodiments, the transmitted configuration can include features indicated by both the InitialFeatureSet elements and the corresponding ExtensionFeatureSet elements associated with the respective identified frequency bands.

In some embodiments, the exemplary method and/or procedure can also include the operations of block 1050, where the network node can transmit or receive information with the UE in the plurality of frequency bands according to the transmitted configuration (e.g., in block 1040).

Figure 11:
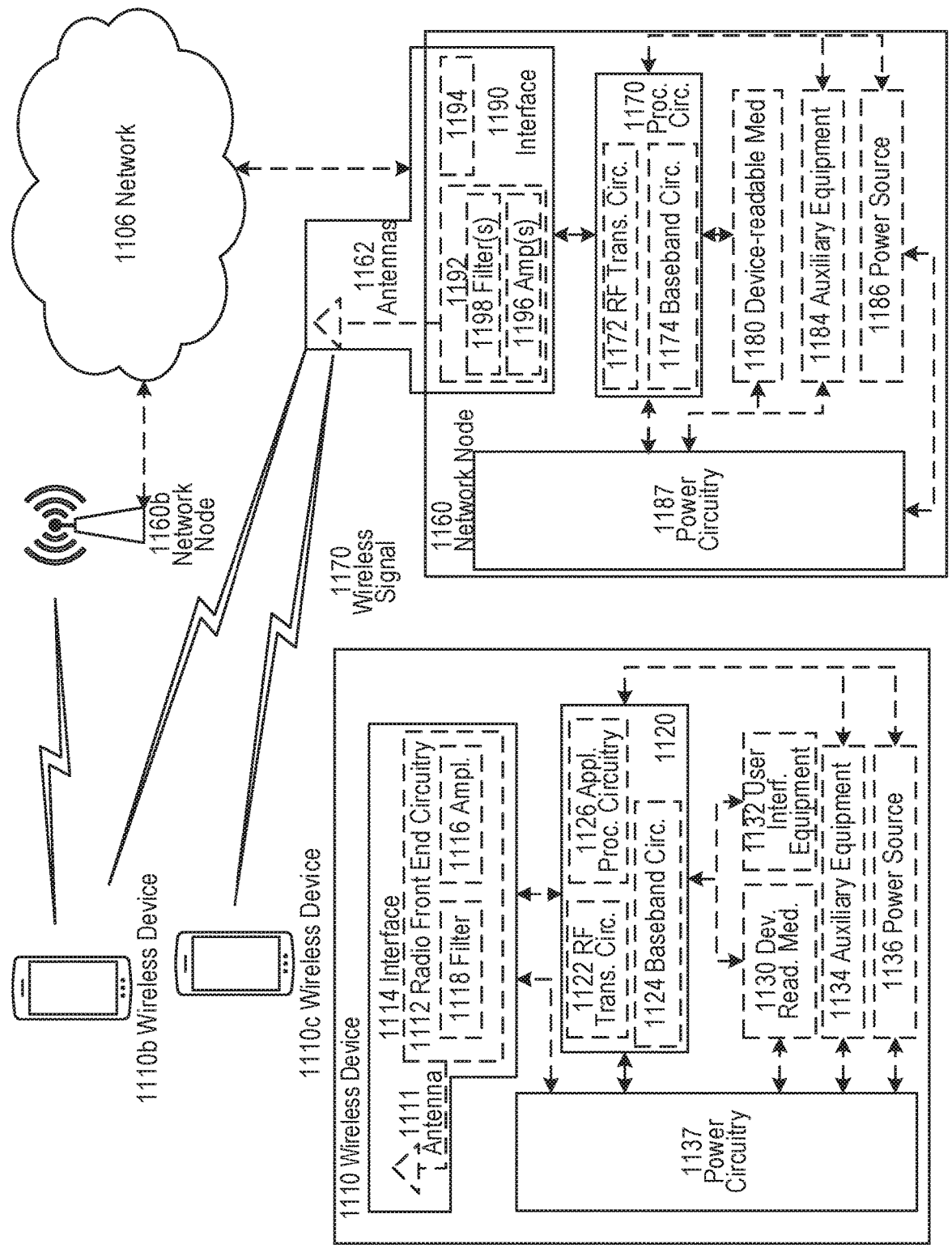
FIG. 11 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, NBs, eNBs, and gNBs). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and a RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 can execute instructions stored in device readable medium 1180 or in memory within processing circuitry 1170. Such functionality can include providing any of the various wireless features, functions, or benefits discussed herein. In some embodiments, processing circuitry 1170 can include a system on a chip (SOC).

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

In some embodiments, a wireless device (WD, e.g., WD 1110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality can include providing any of the various wireless features or benefits discussed herein. For example, processing circuitry 1120 can execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110, and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network, and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
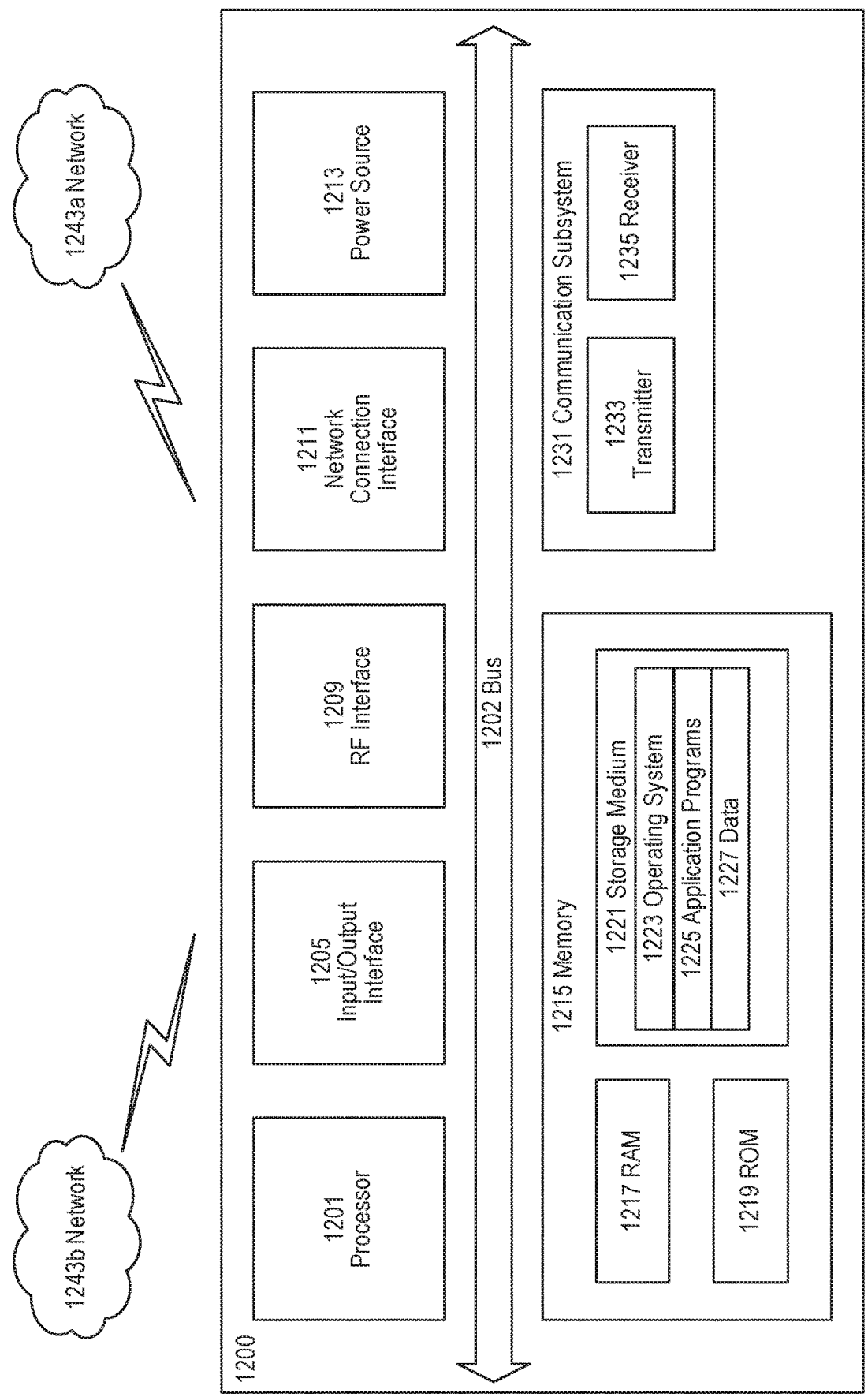
FIG. 12 illustrates an exemplary embodiment of a UE, in accordance with various aspects described herein.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1200 can be any UE identified by the 3$^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243a. Network 1243a can encompass wired and/or wireless networks such as a local-area network (LAN), a wide-area network (WAN), a computer network, a wireless network, a telecommunications network, another like network or any combination thereof. For example, network 1243a can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 can be configured to include operating system 1223, application program 1225 such as a web browser application, a widget or gadget engine or another application, and data file 1227. Storage medium 1221 can store, for use by UE 1200, any of a variety of various operating systems or combinations of operating systems.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243b using communication subsystem 1231. Network 1243a and network 1243b can be the same network or networks or different network or networks. Communication subsystem 1231 can be configured to include one or more transceivers used to communicate with network 1243b. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243b can encompass wired and/or wireless networks such as a local-area network (LAN), a wide-area network (WAN), a computer network, a wireless network, a telecommunications network, another like network or any combination thereof. For example, network 1243b can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
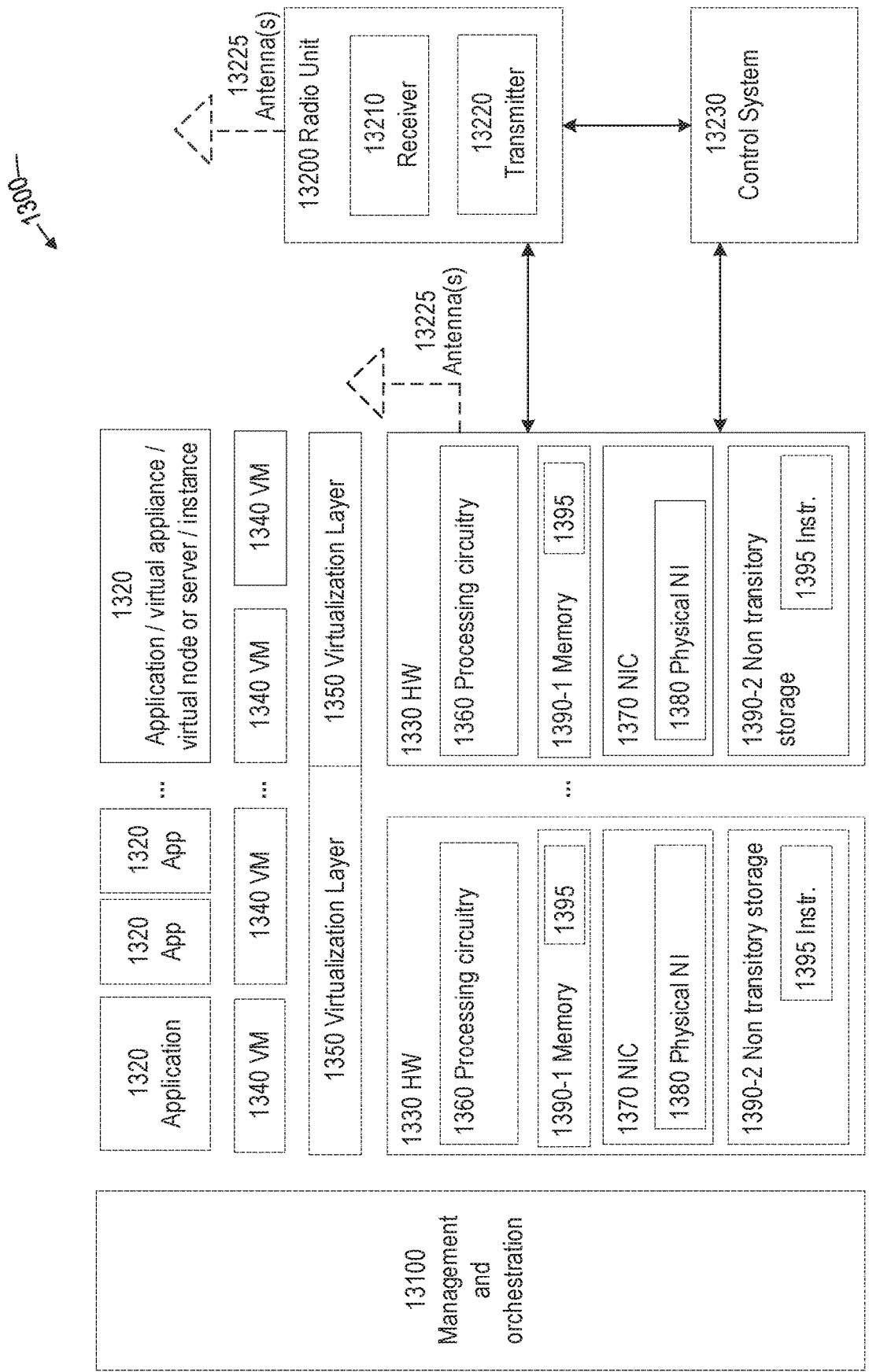
FIG. 13 is a block diagram illustrating an exemplary virtualization environment usable for implementation of various embodiments of network nodes described herein.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

In the context of NFV, Virtual Network Function (VNF) is responsible for handling specific network functions that run in one or more virtual machines 1340 on top of hardware networking infrastructure 1330, and can correspond to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station.

In some embodiments, some signalling can be affected with the use of control system 13230 which can alternatively be used for communication between the hardware nodes 1330 and radio units 13200.

Figure 14:
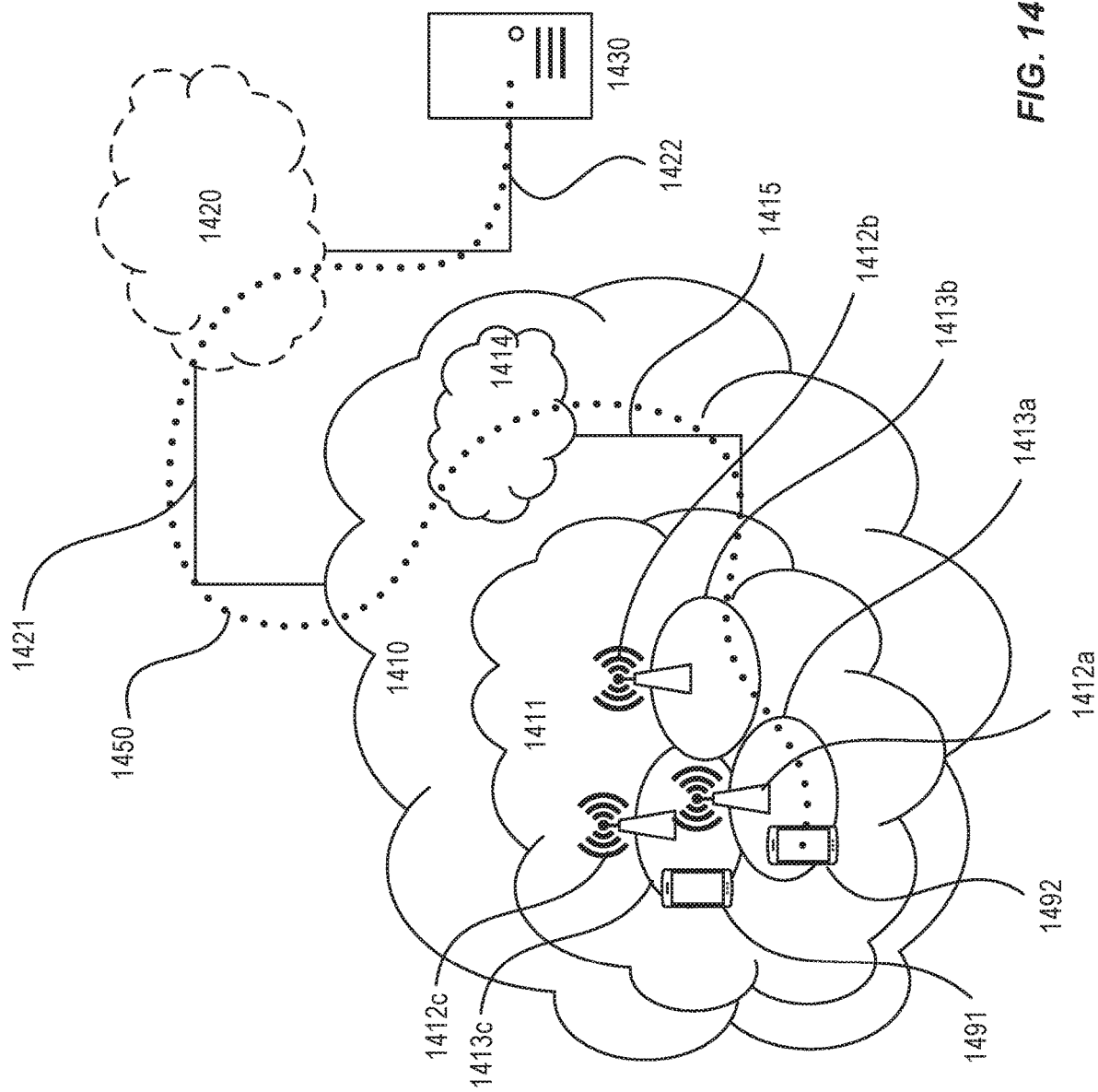
FIGS. 14-15 are block diagrams of various exemplary communication systems and/or networks, in accordance with various aspects described herein.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider, or can be operated by the service provider or on behalf of the service provider.

Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 can also include UE 1530 already referred to. Its hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides.

Figure 15:
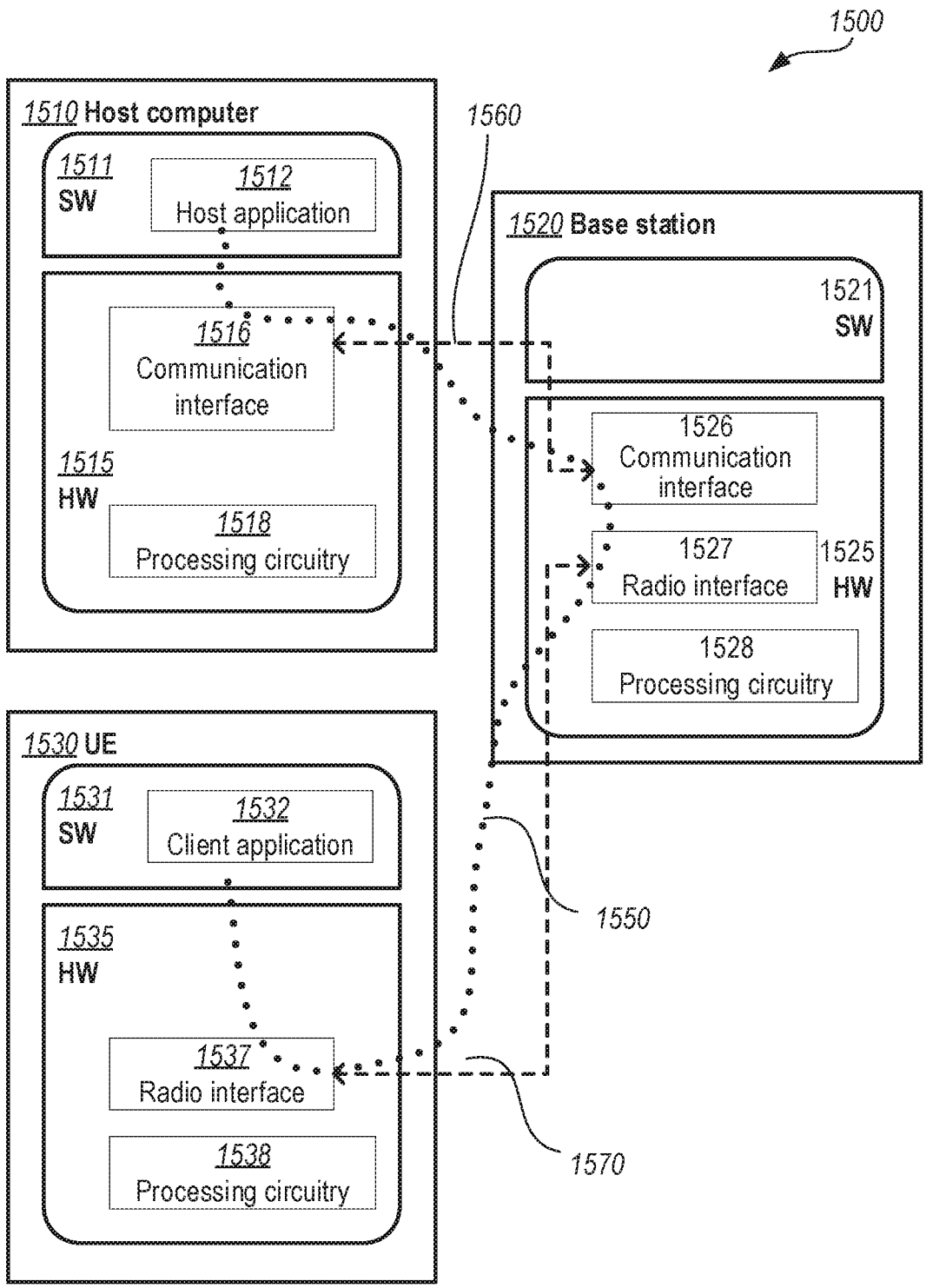

It is noted that host computer 1510, base station 1520 and UE 1530 illustrated in FIG. 15 can be similar or identical to host computer 1430, one of base stations 1412a, 1412b, 1412c and one of UEs 1491, 1492 of FIG. 14, respectively. This is to say, the inner workings of these entities can be as shown in FIG. 15 and independently, the surrounding network topology can be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors etc.

FIG. 16 is a flowchart illustrating an exemplary method and/or procedure implemented in a communication system, in accordance with one embodiment. The communication system includes a host computer, a base station and a UE which, in some exemplary embodiments, can be those described with reference to FIGS. 14 and 15. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

FIG. 18 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for a user equipment (UE) to advertise UE capabilities to a network node in a radio access network (RAN), the method comprising:
  transmitting, to the network node, information describing a plurality of feature sets supported by the UE, the information comprising:
    one or more InitialFeatureLists, each InitialFeatureList comprising one or more non-extensible InitialFeatureSet elements, each non-extensible InitialFeatureSet element indicating the UE's support for one or more initial features;
    one or more ExtensionFeatureLists, wherein:
      each ExtensionFeatureList is associated with a particular InitialFeatureList; and
      each ExtensionFeatureList comprises one or more ExtensionFeatureSet elements, each InitialFeatureSet element indicating the UE's support for one or more extension features;
  transmitting, to the network node, one or more BandCombination elements, wherein each BandCombination element comprises:
    a list of frequency bands in which the UE is simultaneously operable to transmit and/or receive information; and
    for each particular frequency band comprising the list, a further list of one or more FeatureSetIdentifiers, wherein each FeatureSetIdentifer corresponds to a particular InitialFeatureSet element and an associated ExtensionFeatureSet element that describe features supported by the UE when operating in the particular frequency band.

2. The method of embodiment 1, wherein each InitialFeatureSet element and the associated ExtensionFeatureSet element identify features supported by the UE with respect to a single component carrier (CC).

3. The method of embodiment 1, wherein each InitialFeatureSet element and the associated ExtensionFeatureSet element identify features supported by the UE with respect to an entire frequency band.

4. The method of any of embodiments 1-3, wherein each InitialFeatureSet element and the associated ExtensionFeatureSet element identify features related to one of uplink operation and downlink operation.

5. The method of any of embodiments 1-4, wherein an ExtensionFeatureSet at a particular position in an ExtensionFeatureList corresponds to an InitialFeatureSet at the same particular position in an InitialFeatureList.

6. The method of any of embodiments 1-5, wherein:
  each BandCombination element comprises an identifier of a particular FeatureSetCombination associated with the combination of the plurality of frequency bands comprising the list; and
  the particular FeatureSetCombination comprises the one or more FeatureSetIdentifiers comprising the further list.

7. A method for a network node, operable in a radio access network (RAN), to receive capabilities advertised by a user equipment (UE), the method comprising:
  receiving, from the UE, information describing a plurality of feature sets supported by the UE, the information comprising:
    one or more InitialFeatureLists, each InitialFeatureList comprising one or more non-extensible InitialFeatureSet elements, each non-extensible InitialFeatureSet element indicating the UE's support for one or more initial features;
    one or more ExtensionFeatureLists, wherein:
      each ExtensionFeatureList is associated with a particular InitialFeatureList; and
      each ExtensionFeatureList comprises one or more ExtensionFeatureSet elements, each InitialFeatureSet element indicating the UE's support for one or more extension features;

receiving, from the UE, one or more BandCombination elements, wherein each BandCombination element comprises:
a list of frequency bands in which the UE is simultaneously operable to transmit and/or receive information; and
for each particular frequency band comprising the list, a further list of one or more FeatureSetIdentifiers, wherein each FeatureSetIdentifer corresponds to a particular InitialFeatureSet element and an associated ExtensionFeatureSet element that describe features supported by the UE when operating in the particular frequency band.
determining the UE's capabilities based on the received one or more BandCombination elements and the received information describing the plurality of feature sets supported by the UE.

8. The method of embodiment 7, wherein each InitialFeatureSet element and the associated ExtensionFeatureSet element identify features supported by the UE with respect to a single component carrier (CC).

9. The method of embodiment 7, wherein each InitialFeatureSet element and the associated ExtensionFeatureSet element identify features supported by the UE with respect to an entire frequency band.

10. The method of any of embodiments 7-9, wherein each InitialFeatureSet element and the associated ExtensionFeatureSet element identify features related to one of uplink operation and downlink operation.

11. The method of any of embodiments 7-10, wherein an ExtensionFeatureSet at a particular position in an ExtensionFeatureList corresponds to an InitialFeatureSet at the same particular position in an InitialFeatureList.

12. The method of any of embodiments 7-11, wherein:
each BandCombination element comprises an identifier of a particular FeatureSetCombination associated with the combination of the plurality of frequency bands comprising the list; and
the particular FeatureSetCombination comprises the one or more FeatureSetIdentifiers comprising the further list.

13. The method of any of embodiments 7-12, wherein if the network node does not support an ExtensionFeatureSet element corresponding to a particular FeatureSetIdentifier, determining the UE's capabilities based on the InitialFeatureSet element corresponding to the particular FeatureSetIdentifier but not on the associated ExtensionFeatureSet element.

14. A wireless device configurable to advertise the device's capabilities to a network node in a radio access network (RAN), the wireless device comprising:
processing circuitry configured to perform any of the steps of any of embodiments 1-6; and
power supply circuitry configured to supply power to the wireless device.

15. A network node operable in a radio access network (RAN) and configurable to receive capabilities advertised by a user equipment (UE), the network node comprising:
processing circuitry configured to perform any of the steps of any of embodiments 7-13; and
power supply circuitry configured to supply power to the base station.

16. A user equipment (UE) configurable to advertise the UE's capabilities to a network node in a radio access network (RAN), the UE comprising:
an antenna configured to send and receive wireless signals;
radio front-end circuitry operably coupled to the antenna;
processing circuitry operably coupled to the radio front-end circuitry and configured to perform any of the steps of any of embodiments 1-6;
an input interface connected to the processing circuitry and configured to allow input of information to be processed by the processing circuitry;
an output interface connected to the processing circuitry and configured to output information that has been processed by the processing circuitry; and
a battery connected to the processing circuitry and configured to supply power to the UE.

17. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 7-13.

18. The communication system of the previous embodiment further including the base station.

19. The communication system of the previous two embodiments, further including the UE, wherein the UE is configured to perform operations corresponding to any of embodiments 1-6.

20. The communication system of the previous three embodiments, wherein:
the processing circuitry of the host computer is configured to execute a host application, thereby providing the user data; and
the UE comprises processing circuitry configured to execute a client application associated with the host application.

21. A method implemented in a communication system including a host computer, a base station, and a User Equipment (UE), the method comprising:
at the host computer, providing user data; and
at the host computer, initiating a transmission carrying the user data to the UE via a cellular network comprising the base station, wherein the base station performs any of the operations comprising any of embodiments 7-13.

22. The method of the previous embodiment, further comprising, at the base station, transmitting the user data.

23. The method of the previous two embodiments, wherein the user data is provided at the host computer by executing a host application, the method further comprising, at the UE, executing a client application associated with the host application.

24. A User Equipment (UE) configured to communicate with a base station, the UE comprising a radio interface and processing circuitry configured to perform any of the methods of the previous three embodiments.

25. A communication system including a host computer comprising:
processing circuitry configured to provide user data; and
a communication interface configured to forward user data to a cellular network for transmission to a User Equipment (UE), wherein the UE comprises a radio interface and processing circuitry, operably coupled and configured to perform any of the operations of any of embodiments 1-6.

26. The communication system of the previous embodiment, wherein the cellular network further includes a base station configured to communicate with the UE.

27. The communication system of the previous two embodiments, wherein:
the processing circuitry of the host computer is configured to execute a host application, thereby providing the user data; and
the UE's processing circuitry is configured to execute a client application associated with the host application.

28. A method implemented in a communication system including a host computer, a base station, and a User equipment (UE) the method comprising:
at the host computer, providing user data; and
at the host computer, initiating a transmission carrying the user data to the UE via a cellular network comprising the base station, wherein the UE performs any of the steps of any of embodiments 1-6.

29. The method of the previous embodiment, further comprising at the UE, receiving the user data from the base station.

30. A communication system including a host computer comprising:
communication interface configured to receive user data originating from a transmission from a User equipment (UE) to a base station;
wherein the UE comprises a radio interface and processing circuitry, the UE's processing circuitry configured to perform any of the operations of any of embodiments 1-6.

31. The communication system of the previous embodiment, further including the UE.

32. The communication system of the previous two embodiments, further including the base station, wherein the base station comprises a radio interface configured to communicate with the UE and a communication interface configured to forward to the host computer the user data carried by a transmission from the UE to the base station.

33. The communication system of the previous three embodiments, wherein:
the processing circuitry of the host computer is configured to execute a host application; and
the UE's processing circuitry is configured to execute a client application associated with the host application, thereby providing the user data.

34. The communication system of the previous four embodiments, wherein:
the processing circuitry of the host computer is configured to execute a host application, thereby providing request data; and
the UE's processing circuitry is configured to execute a client application associated with the host application, thereby providing the user data in response to the request data.

35. A method implemented in a communication system including a host computer, a base station, and a User equipment (UE) the method comprising:
at the host computer, receiving user data transmitted to the base station from the UE, wherein the UE performs any of the operations of any of embodiments 1-6.

36. The method of the previous embodiment, further comprising, at the UE, providing the user data to the base station.

37. The method of the previous two embodiments, further comprising:
at the UE, executing a client application, thereby providing the user data to be transmitted; and
at the host computer, executing a host application associated with the client application.

38. The method of the previous three embodiments, further comprising:

at the UE, executing a client application; and
at the UE, receiving input data to the client application, the input data being provided at the host computer by executing a host application associated with the client application;
wherein the user data to be transmitted is provided by the client application in response to the input data.

39. A communication system including a host computer comprising a communication interface configured to receive user data originating from a transmission from a User equipment (UE) to a base station, wherein the base station comprises a radio interface and processing circuitry, the base station's processing circuitry is configured to perform operations of any of embodiments 7-13.

40. The communication system of the previous embodiment further including the base station.

41. The communication system of the previous two embodiments, further including the UE, wherein the UE is configured to communicate with the base station.

42. The communication system of the previous three embodiments, wherein:
the processing circuitry of the host computer is configured to execute a host application; and
the UE is configured to execute a client application associated with the host application, thereby providing the user data to be received by the host computer.

43. A method implemented in a communication system including a host computer, a base station, and a User equipment (UE) the method comprising:
at the host computer, receiving, from the base station, user data originating from a transmission which the base station has received from the UE, wherein the UE performs any of the steps of any of embodiments 1-6.

44. The method of the previous embodiment, further comprising at the base station, receiving the user data from the UE.

45. The method of the previous two embodiments, further comprising at the base station, initiating a transmission of the received user data to the host computer.

46. A non-transitory, computer-readable medium storing computer-executable instructions that, when executed by at least one processor comprising a user equipment (UE), configure the UE to perform operations corresponding to any of the methods of embodiments 1-6.

47. A non-transitory, computer-readable medium storing computer-executable instructions that, when executed by at least one processor comprising a network node, configure the network node to perform operations corresponding to any of the methods of embodiments 7-13.

The invention claimed is:
1. A method for a user equipment (UE) to advertise UE capabilities to a network node in a radio access network (RAN), the method comprising:
transmitting, to the network node, information describing a plurality of feature sets supported by the UE, the information comprising:
one or more InitialFeatureLists, wherein:
each InitialFeatureList includes one or more non-extensible InitialFeatureSet elements, and
each non-extensible InitialFeatureSet element indicates the UE's support for one or more initial features;
one or more ExtensionFeatureLists, wherein:
each ExtensionFeatureList is associated with a particular InitialFeatureList,
each ExtensionFeatureList includes one or more ExtensionFeatureSet elements, and each ExtensionFeatureSet element indicates the UE's support for one or more extension features;

transmitting, to the network node, one or more BandCombination elements, wherein each BandCombination element includes:
- a list of frequency bands in which the UE can concurrently transmit and/or receive information; and
- a FeatureSetCombination element that identifies features supported by the UE within each frequency band included in the list, wherein the features supported by the UE within a particular frequency band are based on:
  - a particular InitialFeatureSet element from each InitialFeatureList, and
  - a corresponding ExtensionFeatureSet element from the ExtensionFeatureList associated with each InitialFeatureList.

2. The method of claim 1, further comprising receiving, from the network node, a configuration including:
- identification of one or more frequency bands, wherein the identified frequency bands are part of a list included in a particular transmitted BandCombination element; and
- for each of the identified frequency bands, configuration of one or more features identified by the particular transmitted BandCombination element.

3. The method of claim 2, wherein the received configuration includes only features indicated by the InitialFeatureSet elements associated with the respective identified frequency bands.

4. The method of claim 2, wherein the received configuration includes features indicated by both the InitialFeatureSet elements and the corresponding ExtensionFeatureSet elements associated with the respective identified frequency bands.

5. The method of claim 2, further comprising transmitting or receiving information with the network node in the identified frequency bands according to the received configuration.

6. The method of claim 1, wherein each InitialFeatureSet element and the associated ExtensionFeatureSet element identify features supported by the UE with respect to the entire particular frequency band.

7. The method of claim 6, wherein each InitialFeatureSet element also identifies features supported by the UE with respect to individual component carriers within the particular frequency band.

8. The method of claim 1, wherein the one or more InitialFeatureLists include a first InitialFeatureList associated with downlink operation and a second InitialFeatureList associated with uplink operation.

9. The method of claim 1, wherein an ExtensionFeatureSet at a particular position in an ExtensionFeatureList corresponds to an InitialFeatureSet at the same particular position in an InitialFeatureList.

10. The method of claim 1, wherein, for each particular frequency band included in the list of frequency bands:
- the FeatureSetCombination element includes one or more FeatureSetIdentifiers for that particular frequency band; and
- each FeatureSetIdentifier is related to a particular InitialFeatureList and to an associated ExtensionFeatureList for that particular frequency band; and
- each FeatureSetIdentifier identifies the particular InitialFeatureSet element from the related InitialFeatureList, and the corresponding ExtensionFeatureSet element from the related ExtensionFeatureList.

11. The method of claim 10, wherein the one or more FeatureSetIdentifiers, for each particular frequency band, include a first FeatureSetIdentifier associated with downlink operation and a second FeatureSetIdentifier associated with uplink operation.

12. A user equipment (UE) configured to advertise UE capabilities to a network node in a radio access network (RAN), the UE comprising:
- radio interface circuitry configured to communicate with the network node; and
- processing circuitry operably coupled to the radio interface circuitry, whereby the processing circuitry and the radio interface circuitry are configured to perform operations corresponding to the method of claim 1.

13. A non-transitory, computer-readable medium storing computer-executable instructions that, when executed by processing circuitry of a user equipment, configure the user equipment to perform operations corresponding to the method of claim 1.

14. A method for a network node, of a radio access network (RAN), to determine capabilities of a user equipment (UE), the method comprising:
- receiving, from the UE, information describing a plurality of feature sets supported by the UE, the information comprising:
  - one or more InitialFeatureLists, wherein:
    - each InitialFeatureList includes one or more non-extensible InitialFeatureSet elements, and
    - each non-extensible InitialFeatureSet element indicates the UE's support for one or more initial features;
  - one or more ExtensionFeatureLists, wherein:
    - each ExtensionFeatureList is associated with a particular InitialFeatureList,
    - each ExtensionFeatureList includes one or more ExtensionFeatureSet elements, and
    - each ExtensionFeatureSet element indicates the UE's support for one or more extension features;
- receiving, from the UE, one or more BandCombination elements, wherein each BandCombination element includes:
  - a list of frequency bands in which the UE can concurrently transmit and/or receive information; and
  - a FeatureSetCombination element that identifies features supported by the UE within each frequency band included in the list, wherein the features supported by the UE within a particular frequency band are based on:
    - a particular InitialFeatureSet element from each InitialFeatureList, and
    - a corresponding ExtensionFeatureSet element from the ExtensionFeatureList associated with each InitialFeatureList; and
- determining the UE's capabilities based on the received one or more BandCombination elements and the received information describing the plurality of feature sets supported by the UE.

15. The method of claim 14, wherein determining the UE's capabilities comprises, for each particular BandCombination element:
- determining whether the network node supports the respective ExtensionFeatureSet elements identified by the particular BandCombination element;
- for each particular ExtensionFeatureSet element that the network node does not support, determining the UE's capabilities based on features described by the associated InitialFeatureSet element but not on features described by the particular ExtensionFeatureSet element; and for each particular ExtensionFeatureSet element that the network node supports, determining the UE's capabilities based on features described by the associated InitialFeatureSet element and the particular ExtensionFeatureSet element.

16. The method of claim 14, further comprising transmitting, to the UE, a configuration including:
   identification of one or more frequency bands, wherein the identified frequency bands are part of a list included in a particular received BandCombination element; and
   for each of the identified frequency bands, configuration of one or more features identified by the particular received BandCombination element.

17. The method of claim 16, wherein the transmitted configuration identifies a plurality of frequency bands for dual connectivity, DC, or carrier aggregation, CA, operation.

18. The method of claim 16, wherein the transmitted configuration includes only features indicated by the InitialFeatureSet elements associated with the respective identified frequency bands.

19. The method of claim 16, wherein the transmitted configuration includes features indicated by both the InitialFeatureSet elements and the corresponding ExtensionFeatureSet elements associated with the respective identified frequency bands.

20. The method of claim 16, further comprising transmitting or receiving information with the UE in the plurality of frequency bands according to the transmitted configuration.

21. The method of claim 14, wherein each InitialFeatureSet element and the associated ExtensionFeatureSet element identify features supported by the UE with respect to the entire particular frequency band.

22. The method of claim 21, wherein each InitialFeatureSet element also identifies features supported by the UE with respect to individual component carriers within the particular frequency band.

23. The method of claim 14, wherein an ExtensionFeatureSet at a particular position in an ExtensionFeatureList corresponds to an InitialFeatureSet at the same particular position in an InitialFeatureList.

24. The method of claim 23, wherein, for each particular frequency band included in the list of frequency bands:
   the FeatureSetCombination element includes one or more FeatureSetIdentifiers for that particular frequency band; and
   each FeatureSetIdentifier is related to a particular InitialFeatureList and to an associated ExtensionFeatureList for that particular frequency band; and
   each FeatureSetIdentifier identifies the particular InitialFeatureSet element from the related InitialFeatureList, and the corresponding ExtensionFeatureSet element from the related ExtensionFeatureList.

25. A network node, of a radio access network (RAN), configured to determine capabilities of a user equipment (UE), the network node comprising:
   radio interface circuitry operable to communicate with the UE; and
   processing circuitry operably coupled to the radio interface circuitry, whereby the processing circuitry and the radio interface circuitry are configured to perform operations corresponding to the method of claim 14.

26. A non-transitory, computer-readable medium storing computer-executable instructions that, when executed by processing circuitry of a network node of a radio access network (RAN), configure the network node to perform operations corresponding to the method of claim 14.

* * * * *